United States Patent
Nabeta

(10) Patent No.: US 7,778,129 B2
(45) Date of Patent: Aug. 17, 2010

(54) OPTICAL DISK APPARATUS, FOCAL POSITION CONTROL METHOD AND FOCAL POSITION CONTROL APPARATUS

(75) Inventor: Masaomi Nabeta, Tokyo (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 11/281,360

(22) Filed: Nov. 18, 2005

(65) Prior Publication Data

US 2006/0120229 A1    Jun. 8, 2006

(30) Foreign Application Priority Data

Nov. 30, 2004   (JP) .............................. 2004-346813

(51) Int. Cl.
*G11B 7/004*  (2006.01)
(52) U.S. Cl. ...................... 369/53.28; 369/94; 369/283
(58) Field of Classification Search ............ 369/44.27, 369/44.34, 53.23, 53.28, 94, 283, 286
See application file for complete search history.

(56) References Cited

U.S. PATENT DOCUMENTS

| | | | | |
|---|---|---|---|---|
| 5,754,507 | A * | 5/1998 | Nishikata | 369/44.29 |
| 6,278,672 | B1 * | 8/2001 | Kobayashi | 369/53.23 |
| 6,480,444 | B2 * | 11/2002 | Tada et al. | 369/44.27 |
| 6,584,048 | B1 * | 6/2003 | Tateishi et al. | 369/44.28 |
| 6,777,657 | B2 * | 8/2004 | Nishio et al. | 250/201.5 |
| 7,126,899 | B2 * | 10/2006 | Ichimura et al. | 369/94 |
| 2002/0195540 | A1 * | 12/2002 | Higuchi | 250/201.5 |
| 2005/0068860 | A1 * | 3/2005 | Kanou | 369/44.27 |
| 2005/0226111 | A1 * | 10/2005 | Shimano et al. | 369/44.41 |

FOREIGN PATENT DOCUMENTS

| | | |
|---|---|---|
| JP | 4-186532 | 7/1992 |
| JP | 10-55602 | 2/1998 |
| JP | 10-134490 | 5/1998 |
| JP | 11-288550 | 10/1999 |
| JP | 2002-373431 | 12/2002 |
| JP | 2004-39125 | 2/2004 |
| JP | 2004-273000 | 9/2004 |
| WO | WO 02/067250 A1 | 8/2002 |

* cited by examiner

*Primary Examiner*—Wayne R Young
*Assistant Examiner*—Thomas D Alunkal
(74) *Attorney, Agent, or Firm*—Oblon, Spivak, McClelland, Maier & Neustadt, L.L.P.

(57) ABSTRACT

An optical disk apparatus can reliably detect the target recording layer of an optical disk having two recording layers. The optical disk apparatus is adapted to recording information on and reproducing information from an optical disk formed by sequentially laying a first recording layer, a second recording layer and a cover layer. The focal point of the light beam is moved closer to the optical disk from the side of the cover layer and the focal point of the light beam is determined to be coming close to the recording layer when the signal level of the focus error signal falls below a positive focus error threshold value after rising above the latter or rises above the negative focus error threshold value after falling below the latter. Then, the focal point of the light beam is kept on moving toward the optical disk after the detection of the recording layer and the recording layer that is detected last is determined to be the first recording layer when the recording layer is not re-detected within a re-detection period.

19 Claims, 10 Drawing Sheets

OPTICAL DISK APPARATUS, FOCAL POSITION CONTROL METHOD AND FOCAL POSITION CONTROL APPARATUS

CROSS REFERENCES TO RELATED APPLICATIONS

The present invention contains subject matter related to Japanese Patent Application JP2004-346813 filed in the Japanese Patent Office on Nov. 30, 2004, the entire contents of which being incorporated herein by reference.

BACKGROUND OF THE INVENTION

1. Field of the Invention

This invention relates to an optical disk apparatus and a focal position control method and a focal position control apparatus that can suitably be applied to an optical disk apparatus for recording on and reproducing data from an optical disk having a plurality of recording layers.

2. Description of the Related Art

Blu-ray disks (Trademark of Sony Corporation) that are large memory capacity optical disks realized by using a violet laser of a short wavelength and an objective lens having a high numerical aperture have become commercially available in recent years. Single layer Blu-ray disks having only a single recording layer (BD-SL: Blu-ray Disk Single Layer) and dual layer Blu-ray disks having two recording layers arranged along the height of the disk (BD-DL: Blu-ray Disk Dual-Layer) have been standardized.

Thus, an optical disk apparatus for recording signals to and reproducing signals from a Blu-ray disk is required to reliably focus the optical beam on the target recording layer of the optical disk and pull in the focus servo when the optical disk is mounted in the optical disk apparatus.

When the focus servo slips off due to an external turbulence or the like during an operation of recording signals on or reproducing signal from an optical disk, it is necessary for the optical disk apparatus to quickly restore the position (address) where it was accessing immediately before the external turbulence, which may be an impact. Then, again the optical disk apparatus is required to reliably focus the optical beam on the target recording layer and pull in the focus servo.

As for controlling pulling in the focus servo for a dual layer Blu-ray disk (to be referred to as focus search hereinafter), methods have been proposed to detect the surface of the cover layer of the optical disk according to the change in the level of the sum signal or the focus error signal output from the optical pickup of the optical disk apparatus (see, for example, Jpn. Pat. Appln. Laid-Open Publication No. 2004-39125).

The sum signal is the sum of the detection signals output from the photodetector of the optical pickup and its signal level varies as a function of the quantity of light reflected from the optical disk. Therefore, the signal level rises when the focus of the light beam comes close to the surface of the cover layer or the recording layer, which is a reflector of light. The focus error signal is, on the other hand, proportional to the distance from the focal point of the light beam to the recording layer. It is adapted to cover a certain distance from the in focus position for outputting focus error signals. Thus, the focus error signal draws a substantially S-shaped curve when the focal point of the light beam passes the recording layer.

Therefore, referring to FIG. 1 of the accompanying drawings, it is so defined that the surface of the cover layer is detected when the first increase of the sum signal is detected as the objective lens is driven to move closer to the objective lens, while monitoring the sum signal and the focus error signal. Additionally, it is so defined that the focal point of the light beam comes close to the recording layer when the objective lens falls in a state where the signal level of the sum signal is found not lower than a predetermined sum signal threshold value and a rise of the level of the focus error signal is detected as the objective lens is driven to move further to approach the optical disk.

As a matter of course, a rise of the level of the focus error signal occurs once when the optical disk has a single recording layer and twice when the optical disk has two recording layers. When a focus search operation is conducted for the recording layer of a single layer disk or the first recording layer of a dual layer disk, the first rise of the level of the focus error signal is determined to be a hit at the target recording layer.

When, on the other hand, a focus search operation is conducted for the second recording layer of a dual layer disk, the second rise of the level of the focus error signal that takes place after a fall of the level of the sum signal to below the above described threshold value (detection of a fall of the level of the sum signal) and the following second rise to the above threshold value for the level of the sum signal is determined to be a hit at the target recording layer.

Alternatively, when a focus search operation is conducted for the second recording layer of a dual layer disk, the detection of the first rise of the level of the focus error signal after detecting the second rise (L0 layer) of the level of the focus error signal and reversing the direction of driving the object lens so as to move it away (return) from the optical disk after driving the objective lens to move closer to the optical disk and make the focal point thereof overrun the first layer (L0 layer) is determined to be a hit at the target recording layer.

SUMMARY OF THE INVENTION

As pointed out above, since an optical disk apparatus adapted to use a Blu-ray disk uses a short wave laser and an objective lens having a large numerical aperture, it can be influenced to a large extent by spherical aberration and hence it is necessary to reliably correct the spherical aberration. At the time of a focus search operation, it is necessary to correct the spherical aberration for the recording layer to be pulled in.

Meanwhile, when the spherical aberration is corrected for one of the recording layers, the spherical aberration may still remain for the other recording layer so that consequently the amplitude of the focus error signal may be reduced. Therefore, when the spherical aberration is corrected for the L0 layer, for example, the rise of the level of the focus error signal due to the L1 layer may not be detected.

Additionally, since the two recording layers are arranged close to each other on a Blu-ray disk if compared with a DVD and the like, the peaks of the sum signal due to the two recording layers may occur continuously. Then, the above-described fall of the sum signal may not be detected and hence it may be no longer possible to discriminate the L1 layer and the L0 layer. Furthermore, in the case of a writable Blu-ray disk (BD-RE), the reflectivity of the recording layers and that of the surface of the cover layer are close to each other and hence it may not be possible to discriminate the reflectivity of the recording layers and that of the surface of the cover layer.

Thus, there is a problem about Blu-ray disks that the focus search operation of looking for the target recording layer can end up as failure because of impossibility of detecting the recording layer for the above-described reasons.

If the operation of detecting the L1 layer of the two recording layers fails when a pulling in operation is being conducted for the L0 layer, the objective lens can be driven to move closer to the optical disk and eventually collide with the latter after the focal point passes through the L0 layer.

In view of the above-identified problems, it is therefore an object of the present invention to provide an optical disk apparatus, a focal position control method and a focal position control apparatus that can reliably detect the target recording layer.

In an aspect of the present invention, the above object is achieved by providing an optical disk apparatus for recording information on and reproducing information from an optical disk formed by sequentially laying a first recording layer, a second recording layer and a cover layer by irradiating a light beam from the cover layer side, the apparatus including: an objective lens for converging the light beam emitted from a light source to irradiate the optical disk; a drive means for driving an objective lens in the direction of the optical axis of the light beam to move the focal position of the light beam; a spherical aberration correcting means for correcting the spherical aberration produced by the light beam according to the recording layer to be used for recording or reproduction of information; a light receiving means for receiving reflected light of the light beam and generating a sum signal indicating the quantity of light of the reflected light and a focus error signal for outputting the signal level as a function of the distance from the focal position of the light beam to the recording layer; a recording layer detecting means for moving the focal point of the light beam closer to the recording layer from the cover layer side and detecting the focal point coming closer to the recording layer according to the focus error signal; and a recording layer determining means for keeping on moving the focal point of the light beam closer to the optical disk after the detection by the recording layer detecting means of the recording layer and, upon non-redetection by the recording layer detecting means of the recording layer within a redetection period, determining the recording layer detected last to be the first recording layer.

Thus, with the above defined arrangement, it is possible to reliably detect the target recording layer of an optical disk when the recording layer is not redetected in the redetection period that comes after detecting the recording layer if it is difficult to identify the recording layer according to the sum signal SUM because the two recording layers are arranged close to each other and/or it is not certain to detect the recording layer other than the target recording layer according to the focus error signal because of the influence of the spherical aberration.

An optical disk apparatus according to the invention may further includes a cover layer detecting means for moving the focal point of the light beam closer to the optical disk from the side of the cover layer and determining the focal point of the light beam as passing through the surface of the cover layer when the level of the sum signal falls below the first sum signal threshold value after rising above the threshold value for the first time and detecting the recording layer after the detection of the cover layer by the cover layer detecting means. With this arrangement, it is possible to reliably detect the target recording layer of an optical disk if it is difficult to discriminate the recording layer and the surface of the cover layer according to the sum signal because the reflectivity of the recording layer and that of the surface of the cover layer are close to each other.

An optical disk apparatus according to the invention may further include an overrun means for keeping on moving the focal point of the light beam closer to the optical disk for a predetermined period after the determination by the recording layer determining means of the detected recording layer as the first recording layer so as to reliably detect the first recording layer of an optical disk having two recording layers by reversing the moving direction of the focal point of the light beam so as to move away from the optical disk after overrunning the first recording layer.

Thus, with the above defined arrangement, it is possible to reliably detect the target recording layer of an optical disk by determining the recording layer detected last to be the first recording layer when the recording layer is not redetected in the redetection period after the detection of the recording layer if it is difficult to identify the recording layer according to the sum signal SUM because the two recording layers are arranged close to each other and/or if it is not certain to detect the recording layer other than the target recording layer of the optical disk according to the focus error signal.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Now, a preferred embodiment of the present invention will be described in greater detail by referring to the accompanying drawings.

(1) Overall Configuration of Optical Disk Apparatus

Figure 1:
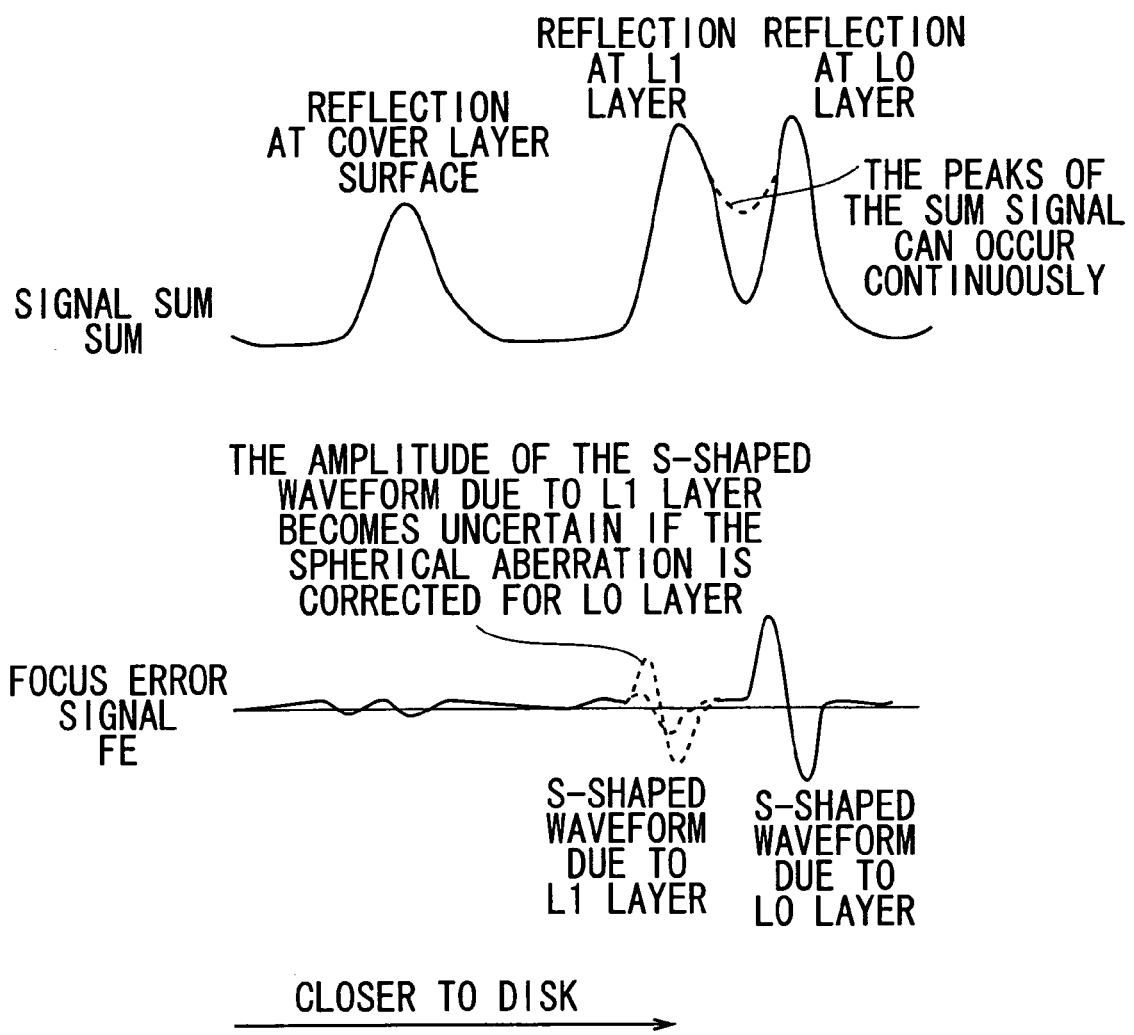
FIG. 1 is a graph of characteristic curves of a sum signal and a focus error signal that can be used by an embodiment of the present invention.
Figure 2:
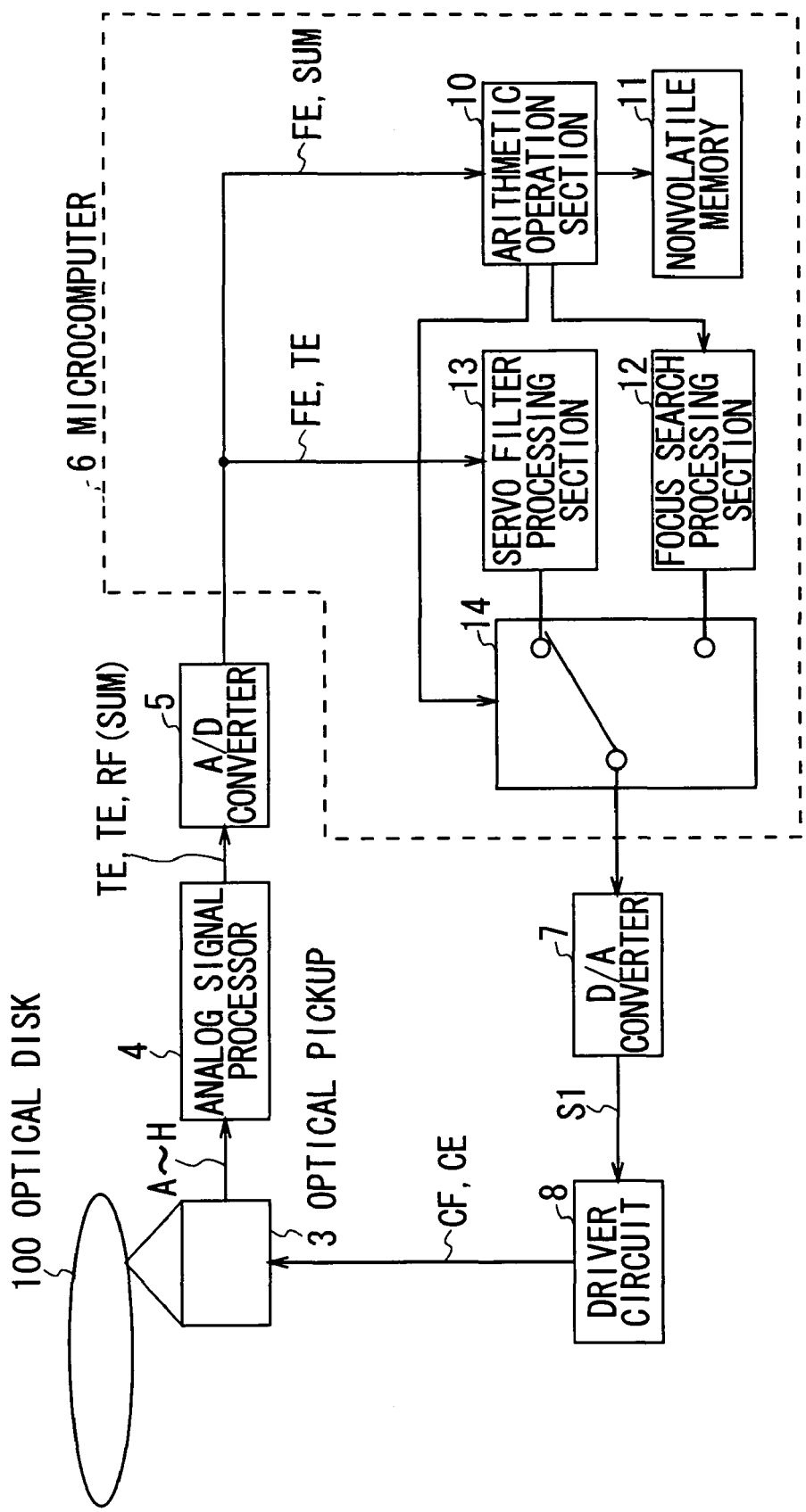
FIG. 2 is a schematic block diagram of an embodiment of optical disk apparatus according to the invention.

Referring to FIG. 2, reference symbol 1 generally denotes an optical disk apparatus that is adapted to Blu-ray disks. It has a microcomputer 6 that operates as focal position control unit for comprehensively controlling the entire optical disk apparatus 1 including an optical pickup 3 of the apparatus according to a basic program and a focus search program (which will be described in greater detail hereinafter) stored in a nonvolatile memory 11 of a microcomputer 6 so as to record data on or reproduce data from an optical disk 100 that is a Blu-ray disk according to a read command or write command, whichever appropriate, that is externally supplied to it.

The nonvolatile memory 11 also stores various predefined values such as the threshold values and the redetection period to be used for focus search processes which will be described later.

The optical disk 100 is mounted on a turn table (not shown) and driven to rotate by a spindle motor (not shown) so that the data recorded on the optical disk 100, the address in pre-groove (ADIP) information relating to wobbling grooves and the like may be read by the optical pickup 3.

Figure 3:
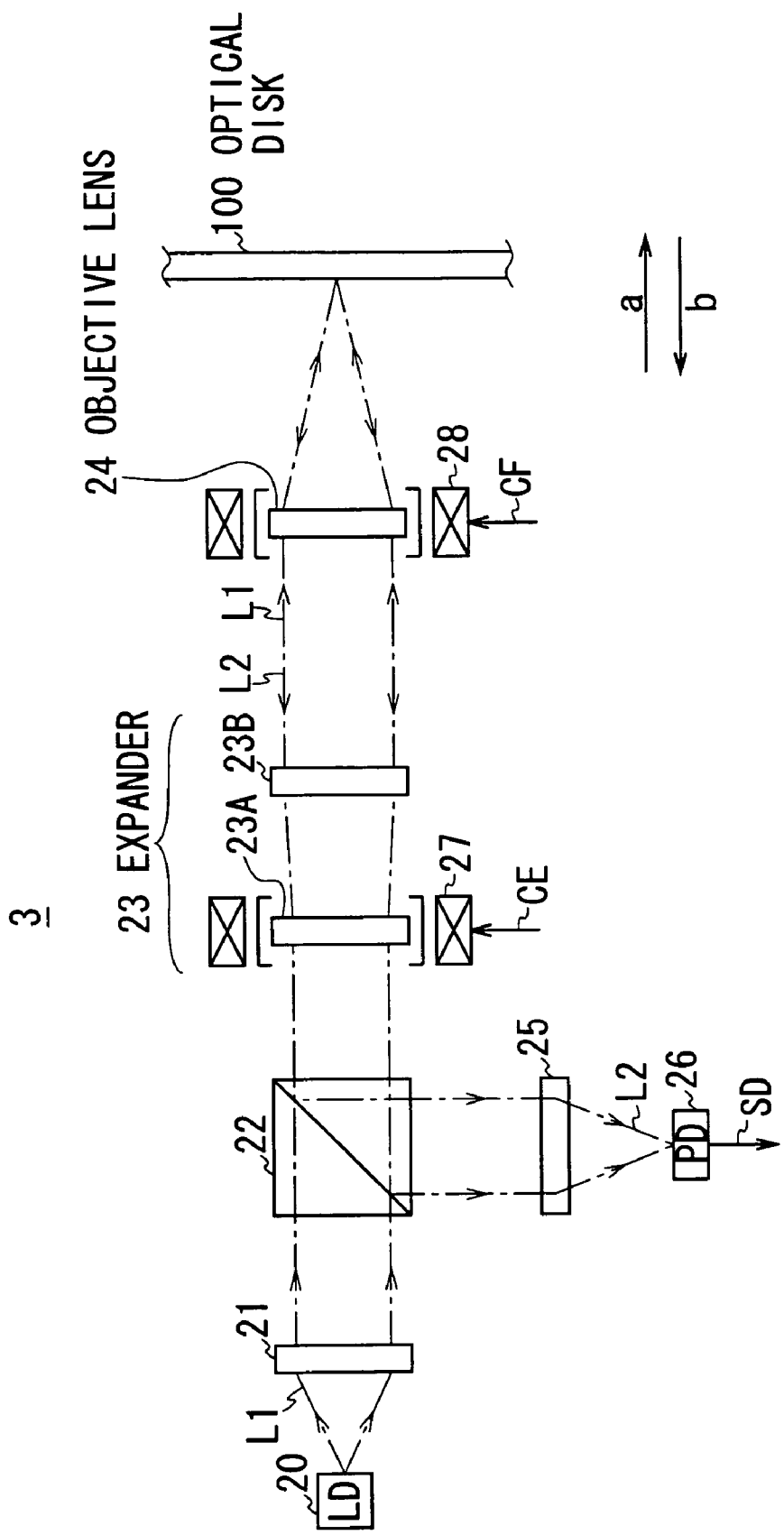
FIG. 3 is a schematic illustration of the optical pickup, illustrating the configuration thereof.

As shown in FIG. 3, the optical pickup 3 is adapted to emit a light beam L1 from a laser diode 20 and irradiate the optical disk 100 with it sequentially by way of a collimator lens 21, a beam splitter 22, an expander 23 including a movable lens 23A and a fixed lens 23B for correcting the spherical aberration of the light beam and an objective lens 24 that operates as output terminal of the laser beam.

Note that the optical pickup 5 is adapted to correct the spherical aberration of the laser beam L1 that arises because the numerical aperture of the object lens 24 is as large as 0.85 by means of the expander 23 that operates as a spherical aberration correcting means.

More specifically, the movable lens 23A of the expander 23 is held movable in the direction of arrow a and also in the direction of arrow b by means of an actuator 27 so that the spherical aberration of the light beam L1 can be properly corrected by driving the actuator 27 according to the expander servo signal CE from the microcomputer 6.

The objective lens 24 is held movable in the focusing directions (including the direction of arrow a and the direction of arrow b) and also in the tracking direction by means of a biaxial actuator 28 that operates as a drive means so that the focal point of the light beam L1 can be made to coincide with the recording surface of the optical disk 100 by driving the biaxial actuator 28 according to the focus servo signal CF from the servo drive circuit 7.

The optical pickup 5 reflects the reflection light beam L2 reflected by the recording surface of the optical disk 100 by means of a beam splitter 22 and sequentially by way of the objective lens 24, the fixed lens 23B and the movable lens 23A of the expander 23 and causes it to enter photodetector 26 by way of a collimator lens 25.

The photodetector 26 that operates as light a receiving means is formed by using a plurality of photo diodes, each of which is adapted to receive reflected light from the optical disk 100, perform photoelectric conversion on the received light, generate a light receiving signal corresponding to the quantity of received light and supply the light receiving signal to an analog signal processor 4 (FIG. 2).

FIG. 4 schematically illustrates the structure of the photodetector 26. It includes a four-partition detector 26A having four light receiving sections A, B, C and D, a two-partition detector 26B having two light receiving sections E and F, and two-partition detector 26C having two light receiving sections G and H. The light receiving sections A through H output respective light reception signals A through H that corresponds to the respective quantities of light they receive. An analog signal processor 8 carries out arithmetic operations for the light reception signals, using the formulas shown below to generate reproduction signal RF, focus error signal FE and tracking error signal TE respectively and supplies them to the analog/digital converter 5.

$$FE=(A+C)-(B+D)$$

$$TE=(A+D)-(B+D)-k\{(E-F)+(G-H)\}$$

$$RF=A+B+C+D \tag{1}$$

The analog/digital converter 5 converts the reproduction signal RF, the focus error signal FE and the tracking error signal TE into digital signals and supplies them to the microcomputer 6.

When an optical disk 100 is mounted into the optical disk apparatus 1 or when the focus servo slips off due to an external turbulence during an operation of recording signals on or reproducing signals from an optical disk, the optical disk apparatus 1 pulls in the focus servo (as a focus search operation) for the target recording layer of the optical disk 100. Note that the reproduction signal RF corresponds to a sum signal SUM, which is a reflected light intensity signal (SUM=A+B+C+D) and the microcomputer 6 performs a focus search operation, using the reproduction signal RF as sum signal SUM.

More specifically, in a focus search operation, the arithmetic operation section 10 of the microcomputer 6 turns the selection switch 14 to the side of the focus search processing section 12 and performs a focus search operation according to the sum signal SUM and the focus error signal FE. When the operation of pulling in the focus servo is completed for the target recording layer, the arithmetic operation section 10 turns the selection switch 14 to the side of a servo filter section 11 and starts operating the focus servo for the target recording layer.

The digital/analog converter 7 converts the spherical aberration control signal and the focus control signal supplied from the micro computer into analog signals in response to a focus search process and a focus servo process and then supplies them to the driver circuit 8. The driver circuit 8 generates an expander servo signal CE and a focus servo signal CF according to the spherical aberration control signal and the focus control signal and supplies them to the optical pickup 3 so as to control the spherical aberration and the focus of the light beam L1.

Thus, the optical disk drive 1 makes the focal point of the light beam L1 coincide with the recording surface of the optical disk 100 and records or reproduce data.

(2) Layer Structure of Optical Disk

Now, the optical disk 100 that is used in the optical disk apparatus 1 according to the invention will be described below. As pointed out above, the optical disk 100 is a Blu-ray disk of either of the two types, one having a single recording layer or one having two recording layers.

The optical disk apparatus 1 records data, utilizing phase changes, under the condition of combining a purple laser with a wavelength of 405 nm and an objective lens having an aperture ratio of 0.85. Then, the optical disk 100 can be operated for recording and reproducing data with a capacity of about 23.3 GB when it has a diameter of 12 cm and shows a track pitch of 0.32 μm and a line density of 0.12 μm/bit so as to use a data block of 64 KB as a recording/reproduction unit with format efficiency of about 82%. The capacity of the optical disk 100 can be increased further when the recording layer is made to show a multilayer structure. In the case of a disk having two recording layers, the capacity of the optical disk 100 can be doubled to 46.6 GB.

Figures 4A, 4B:
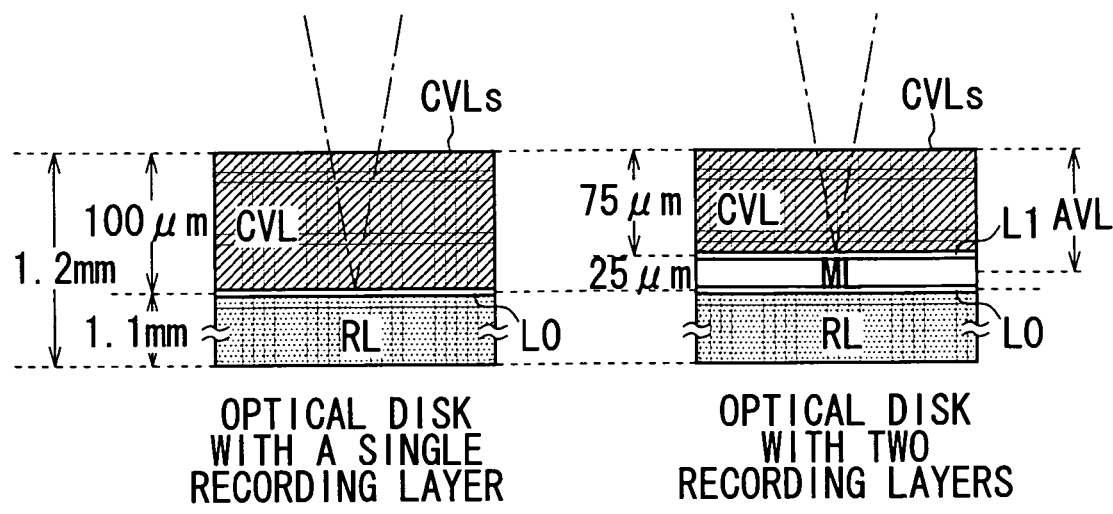
FIGS. 4A and 4B are schematic illustrations of optical disks, illustrating the respective structures thereof.

FIG. 4A and FIG. 4B respectively illustrate the layer structure of an optical disk having a single recording layer and that of an optical disk having two recording layers. The optical disk 100 has a thickness of 1.2 mm both in FIG. 4A where a single recording layer is provided and in FIG. 4B where two recording layers are provided. The substrate RL of the optical disk 100 that is made of polycarbonate occupies a thickness of about 1.1 mm. In both FIG. 4A and FIG. 4B, the light beam L1 from the optical disk apparatus 1 that is indicated by dotted broken lines is emitted from the side of the cover layer (substrate) CVL.

In the optical disk 100 having a single recording layer as shown in FIG. 4A, the recording layer L0 is formed by using a phase change recording film arranged on a 1.1 mm thick substrate RL and a 100 μm thick cover layer CVL is formed on the recording layer L0.

On the other hand, in the optical disk 100 having two recording layers as shown in FIG. 4B, the first recording layer L0 is formed by using a first phase change recording film on a 1.1 mm thick substrate RL and the second recording layer L1 is formed thereon with a 25 μm thick middle layer ML by using also a second phase change recording film. Then, a 75 μm thick cover layer CVL is formed on the second recording layer L1. The first recording layer L0 is located at a position separated from the surface of the cover layer CVL by 100 μm as in the case of the optical disk 100 having a single recording layer.

Therefore, the cover layer CVL has a thickness of 100 μm both in the case of the optical disk 100 having a single recording layer and in the case of the optical disk 100 having two recording layers. Whereas, a 75 μm thick cover layer CVL is formed on the second recording layer L1.

(3) Focus Search Operation According to the Present Invention

As pointed out above, when an optical disk 100 is mounted in the optical disk apparatus 1 or when the focus servo slips off due to an external turbulence during an operation of recording signals on or reproducing signals from the optical disk 100, the optical disk apparatus 100 pulls in the focus servo for the target recording layer of the optical disk 100 (as a focus search operation) At this time, the optical disk apparatus 1 follows a sequence that differs depending on the structure of the optical disk 100 (if the optical disk 100 has a single recording layer or two recording layers).

(3-1) Focus Search for Optical Disk Having Two Recording Layers

Firstly, the focus search operation on an optical disk having two recording layers will be described below. The optical disk 100 has two recording layers including the L0 layer and the L1 layer (FIG. 4B). The operation is controlled differently depending on if the target recording layer is the L0 layer or the L1 layer.

When a focus search operation is conducted for the L1 layer of the optical disk 100, the recording layer that is detected first after detecting the cover layer may safely be determined to be the L1 layer because the L1 layer is located closer to the cover layer than the L0 layer.

Thus, in a focus search operation for the L1 layer of the optical disk 100 having two recording layers, the arithmetic operation section 10 of the microcomputer 6 that operates as a spherical aberration correcting means firstly controls the focus search processing section 12 so as to select an optimal spherical aberration correction value (which corresponds to the position of the movable lens 23A of the expander 23) for the L1 layer.

Then, the microcomputer 6 that operates as a cover layer detection means moves the objective lens 24 away from the optical disk 100 by a sufficient distance. Subsequently, it moves the objective lens 24 toward the surface of the optical disk 100, while monitoring the signal level of the sum signal SUM and the focus error signal FE.

Figure 5:
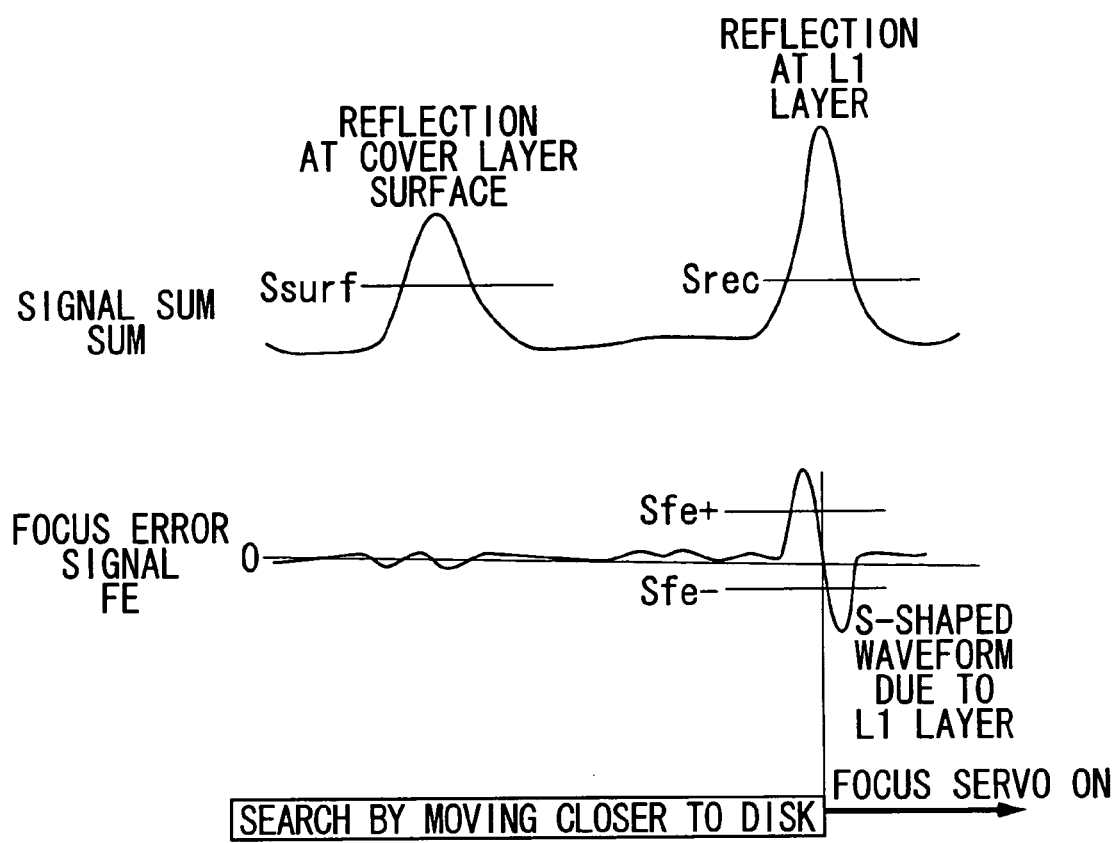
FIG. 5 is a graph of characteristic curves, illustrating the focus search operation for the L1 layer of an optical disk having two recording layers.

Then, as shown in FIG. 5, the microcomputer 6 that operates as the cover layer detection means compares the sum signal SUM and the sum signal cover layer surface threshold value Ssurf, which is the first sum signal threshold value, and recognizes the span that corresponds to the time period between the time when the sum signal firstly rises above the sum signal cover layer surface threshold value Ssurf and the time when it falls below the threshold value as surface of the cover layer.

As the microcomputer 6 that operates as a recording layer detection means recognizes the surface of the cover layer, it moves the objective lens 24 further toward the surface of the optical disk 100, while monitoring the signal level of the sum signal SUM and the focus error signal FE in order to detect the L1 layer.

When the recording layer detection requirement that "the sum signal SUM rises above the sum signal recording layer threshold value Srec, which is the second sum signal threshold value, and the signal level of the focus error signal FE rises above a predetermined positive focus error threshold value Sfe+ and then falls below it or falls below a predetermined negative focus error threshold value Sfe− and then rises above it" is met, the microcomputer 6 that operates as the recording layer detection means determines that it is the first peak of the S-shaped waveform attributable to the L1 layer (as viewed from the side of the disk surface) and the focal point of the light beam is moving closer to the recording layer L1.

When the microcomputer 6 that operates as the recording layer detection means detects that the signal level of the focus error signal FE becomes equal to "0" (so-called zero cross), it so determines that the focal point of the light beam coincide with the L1 layer. Then, it selects the position of the objective lens 24 at this time as objective lens bias value and starts operating the focus servo for the L1 layer, using the objective lens bias value and the spherical aberration correction value.

On the other hand, since the L0 layer of the optical disk 100 having two recording layers is located remote as viewed from the side of the cover layer, the spherical aberration remains for the L1 layer that is located closer as viewed from the side of the cover layer when the spherical aberration is corrected for the L0 layer so that consequently the S-shaped waveform of the focus error signal FE attributable to the L1 layer becomes uncertain. Then, it is not possible to predict if the S-shaped waveform attributable to the L1 layer will rise above the above described positive focus error threshold value Sfe+ or not (or fall below the above described negative focus error threshold value Sfe− or not). Thus, it is not possible to determine if the second S-shaped waveform corresponds to the L0 layer or not.

Additionally, since the two recording layers are located close to each other on a Blu-ray disk if compared with those on a DVD or the like and the reflectivity of the recording layer or layers and that of the surface of the cover layer are close to each other on a rewritable BD-RE disk, it is also difficult to discriminate the L0 layer and the L1 layer on the basis of a fall of the sum signal SUM.

For these reasons, microcomputer 6 that operates as the recording layer detection means keeps on moving the objective lens 24 toward the optical disk 100 after detecting the S-shaped waveform of the focus error signal FE in the focus search operation for the L0 layer of the optical disk 100 and waits for the appearance of an S-shaped waveform attributable to the next recording layer.

Then, if the recording layer detection requirement (that an S-shaped waveform reappears within a predetermined redetection period Tr) is met within the predetermined redetection period Tr after the zero cross point of the first S-shaped waveform, the microcomputer 6 that operates as the recording layer detection means neglects the first S-shaped waveform because it is not attributable to the L0 layer and once again waits for the appearance of an S-shaped waveform attributable to the next recording layer.

If, on the other hand, the next S-shaped waveform is not detected within the redetection period Tr, the microcomputer 6 that operates as the recording layer detection means determines that the last S-shaped waveform is attributable to the L0 layer. Then, the microcomputer 6 that operates as an overrun means keeps on moving the objective lens 24 toward the optical disk 100 after the detection of the L0 layer to make the focal point of the light beam overrun the L0 layer.

Then, the microcomputer 6 determines that the focal point of the light beam passes the L0 layer when the sum signal SUM crosses the sum signal recording layer threshold value Srec to rise above the latter and allows the focal point of the light beam to sufficiently move away from the L0 layer by keeping on moving the objective lens 24 toward the optical disk 100 during the overrun period Tover.

Thereafter, the microcomputer 6 that operates as the recording layer detection means reverses the direction of moving the objective lens 24 so as to make it move away from the optical disk 100 and detects the zero cross point of the S-shaped waveform relative to the L0 layer on its way back.

As a result, it is possible to reliably detect the L0 layer of the two recording layers regardless of the magnitude of the amplitude of the S-shaped waveform attributable to the L1 layer.

Now, the above described focus search operation for the L0 layer of the two recording layers will be described in greater detail in terms of the amplitude of the S-shaped waveform attributable to the L1 layer when it is large and when it is small.

Figure 6:
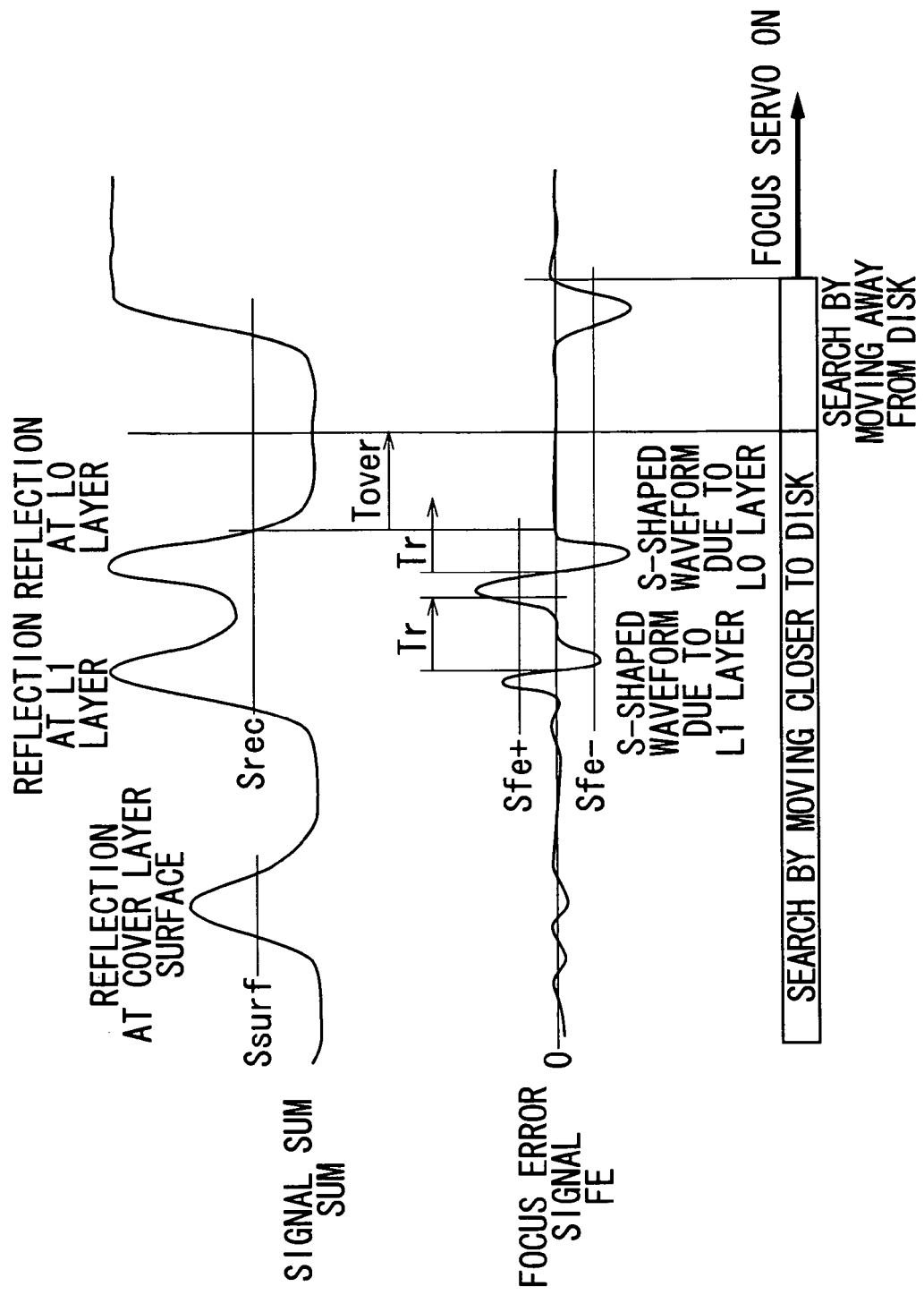
FIG. 6 is a graph of characteristic curves, illustrating the focus search operation for the L0 layer of an optical disk having two recording layers.

When the amplitude of the S-shaped waveform attributable to the L1 layer is large, as the objective lens 24 is kept on moving toward the surface of the optical disk 100, firstly a peak of the sum signal SUM appears due to the reflection at the surface of the cover layer of the optical disk 100 as shown in FIG. 6. Then, the microcomputer 6 recognizes the span that corresponds to the time period between the time when the sum signal SUM firstly rises above the sum signal cover layer surface threshold value Ssurf and the time when it falls below the threshold value as the surface of the cover layer.

After detecting the surface of the cover layer, the microcomputer 6 keeps on moving the objective lens 24 toward the optical disk 100 in order to detect the recording layers and waits for a situation that satisfies the requirement that "the sum signal SUM rises above the sum signal recording layer threshold value Srec and the signal level of the focus error signal FE rises above a predetermined positive focus error threshold value Sfe+ and then falls below it or falls below a predetermined negative focus error threshold value Sfe− and then rises above it".

Since the amplitude of the S-shaped waveform of the focus error signal FE due to the reflection at the L1 layer is large in FIG. 6, the requirement that "the sum signal SUM rises above the sum signal recording layer threshold value Srec and the signal level of the focus error signal FE rises above a predetermined positive focus error threshold value Sfe+ and then falls below it" is met so that the L1 layer is firstly detected.

However, it is not possible to determine if the S-shaped waveform is attributable to the reflection at the L1 layer or to the reflection at the L0 layer. Therefore, the microcomputer 6 keeps on moving the objective lens 24 toward the optical disk 100 in order to detect the next recording layer.

Since the recording layer that is detected first is the L1 layer, the S-shaped waveform attributable to the L0 layer appears within the redetection period Tr from the zero cross point of the S-shaped waveform relative to the L1 layer so that it is determined that the requirement that "the sum signal SUM rises above the sum signal recording layer threshold value Srec and the signal level of the focus error signal FE rises above a predetermined positive focus error threshold value Sfe+ and then falls below it" is satisfied and hence a new recording layer is detected.

While the new recording layer is the L0 layer as a matter of fact, the microcomputer 6 still keeps on moving the objective lens 24 toward the optical disk 100 in order to detect the next recording layer.

Since the newly detected recording layer is the L0 layer, no S-shaped waveform appears in the redetection period Tr so that the microcomputer 6 determines that the last S-shaped waveform is attributable to the L0 layer. Therefore, it keeps on moving the objective lens 24 toward the optical disk 100 for the overrun period Tover from the time when the sum signal SUM falls below the sum signal recording layer threshold value Srec and then reverses the moving direction of the objective lens 24 so as to redetect the L0 layer in the opposite direction.

Then, after detecting the L0 layer by referring to the recording layer detection requirement, the microcomputer 6 selects the position of the objective lens 24 at the time of the zero cross point of the S-shaped waveform as objective lens bias value and starts operating the focus servo for the L0 layer, using the objective lens bias value and the spherical aberration correction value.

Figure 7:
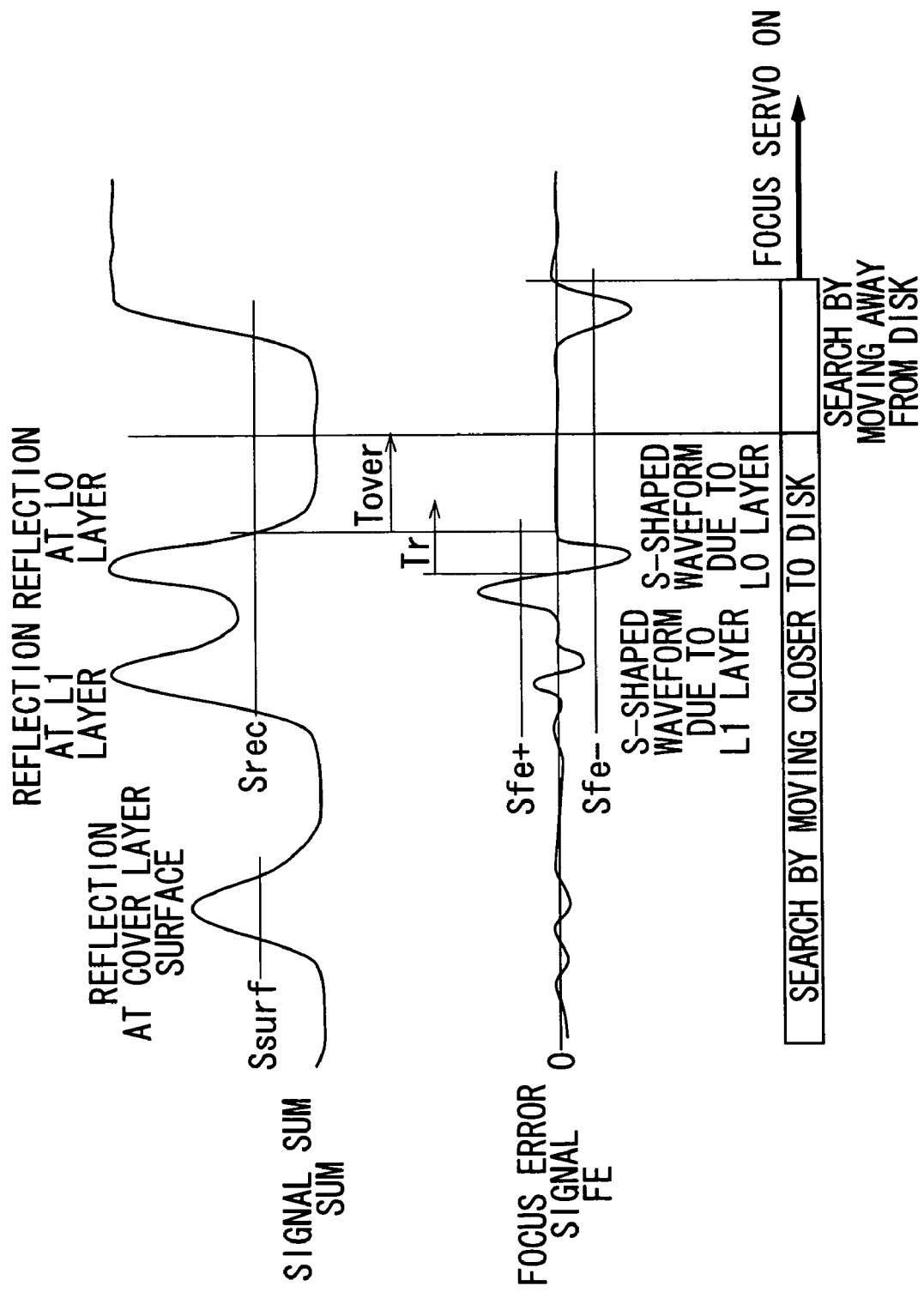
FIG. 7 is another graph of characteristic curves, illustrating the focus search operation for the L0 layer of an optical disk having two recording layers.

When, on the other hand, the amplitude of the S-shaped waveform attributable to the L1 layer is small, as the objective lens 24 is kept on moving toward the surface of the optical disk 100, firstly a peak of the sum signal SUM appears due to the reflection at the surface of the cover layer of the optical disk 100 as shown in FIG. 7. Then, the microcomputer 6 recognizes the span that corresponds to the time period between the time when the sum signal SUM firstly rises above the sum signal cover layer surface threshold value Ssurf and the time when it falls below the threshold value as the surface of the cover layer.

After detecting the surface of the cover layer, the microcomputer 6 keeps on moving the objective lens 24 toward the optical disk 100 in order to detect the recording layers and waits for a situation that satisfies the requirement that "the sum signal SUM rises above the sum signal recording layer threshold value Srec and the signal level of the focus error signal FE rises above a predetermined positive focus error threshold value Sfe+ and then falls below it or falls below a predetermined negative focus error threshold value Sfe− and then rises above it".

Since the amplitude of the S-shaped waveform of the focus error signal FE due to the reflection at the L1 layer is small in FIG. 7, the S-shaped waveform does not meet the recording layer detection requirement so that the microcomputer 6 keeps on moving the objective lens 24 toward the optical disk 100 without detecting the L1 layer.

Then, an S-shaped waveform that is attributable to the reflection at the L0 layer appears and thus the microcomputer 6 detects the L0 layer. However, it is not possible to determine if the S-shaped waveform is attributable to the reflection at the L1 layer or to the reflection at the L0 layer. Therefore, the microcomputer 6 keeps on moving the objective lens 24 toward the optical disk 100 in order to detect the next recording layer.

Since the recording layer that is detected first is the L0 layer, the next S-shaped waveform does not appear within the redetection period Tr so that the microcomputer 6 determines that the last S-shaped waveform is attributable to the L0 layer. Therefore, it keeps on moving the objective lens 24 toward the optical disk 100 for the overrun period Tover from the time when the sum signal SUM falls below the sum signal recording layer threshold value Srec and then reverses the moving direction of the objective lens 24 so as to redetect the L0 layer in the opposite direction.

Then, after detecting the L0 layer by referring to the recording layer detection requirement, the microcomputer 6 selects the position of the objective lens 24 at the time of the zero cross point of the S-shaped waveform as objective lens bias value and starts operating the focus servo for the L0 layer, using the objective lens bias value and the spherical aberration correction value.

Thus, the optical disk apparatus 1 can reliably conduct a focus search operation for the L0 layer of an optical disk having two recording layers.

(3-2) Focus Search for Optical Disk Having Single Recording Layer

Now, the focus search operation of the embodiment on an optical disk having a single recording layer will be described below. The optical disk 100 has only a single recording layer, or the L0 layer (FIG. 4A). Therefore, the optical disk apparatus 1 conducts a focus search operation on the optical disk having a single recording layer, following the above-described sequence of detecting the L0 layer of an optical disk having two recording layers.

Since the reflectivity of the surface of the cover layer and that of the L0 layer are differentiated to a large extent, it is poorly probable that the surface of the cover layer is mistaken for the L0 layer and hence the step of detecting the surface of the cover layer by referring to the above described sum signal cover layer surface threshold value Ssurf may be omitted in the focus search operation.

(4) Focus Search Process Sequence

Now, the process sequence to be followed in a focus search operation for the target recording layer by the microcomputer 6 when executing a focus search program will be described in detail by referring to the flowchart of FIG. 8. Note, however, that the focus search process for the L1 layer of an optical disk having two recording layers is identical with that of techniques in related art, it will not be described here. In other words, only the focus search process for the L0 layer of an optical disk having two recording layers will be described below because it characterizes the present invention.

Figure 8:
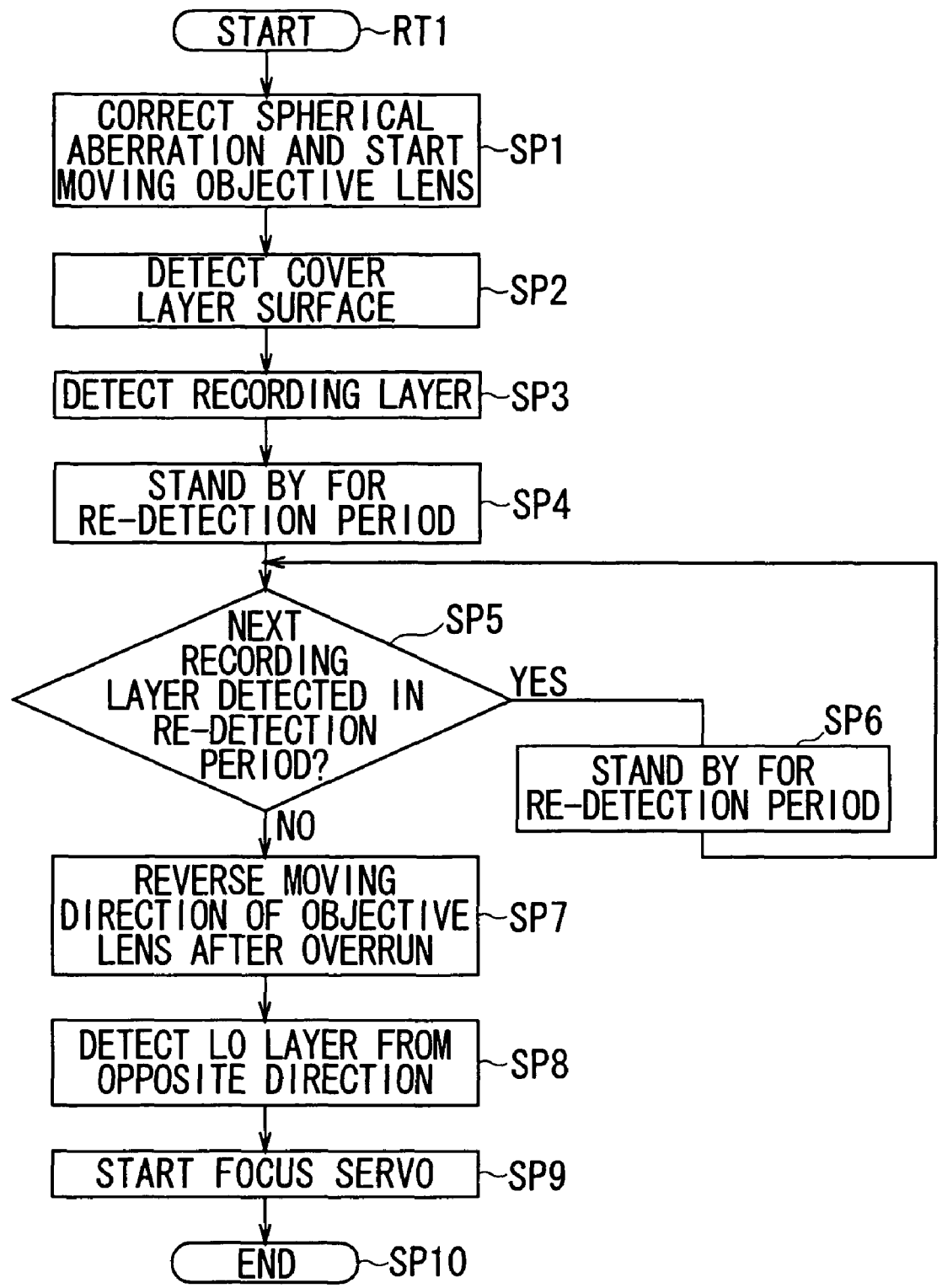
FIG. 8 is a flowchart of the focus search operation for the L0 layer of an optical disk having two recording layers.

Referring to FIG. 8, the microcomputer 6 starts the focus search process routine RT1 for the L0 layer of an optical disk having two recording layers and, in Step SP1, it optimally selects the spherical aberration correction value for the target L0 layer and subsequently starts moving the objective lens 24 toward the optical disk 100 before it goes to the next step, or Step SP2.

In Step SP2, the microcomputer 6 compares the sum signal SUM and the predetermined sum signal cover layer surface threshold value Ssurf and, if it detects a situation where the sum signal SUM rises above the sum signal cover layer surface threshold value Ssurf and subsequently falls below the threshold value, it assumes that it detects the surface of the cover layer and goes to the next step, or Step SP3.

In Step SP3, the microcomputer 6 detects the recording layer according to the above described recording layer detection requirement and, if it detects the recording layer, it goes to the next step, or Step SP4, where it stands by for the redetection period Tr from the zero cross point of the S-shaped waveform relative to the newly detected recording layer and then goes to the next step, or Step SP5.

In Step SP5, the microcomputer 6 determines if it detects a new recording layer during the redetection period Tr or not. If it detects a new recording layer in the redetection period Tr, the microcomputer 6 moves to Step SP6, where it stands by for redetection period Tr from the zero cross point of the S-shaped waveform relative to the newly detected recording layer and then returns to Step SP5.

If, on the other hand, the microcomputer 6 does not detect any new recording layer in the redetection period Tr, it means that the recording layer detected last is the target L0 layer. Then, the microcomputer 6 goes to Step SP7, where it keeps on moving the objective lens 24 toward the optical disk 100 for the overrun period Tover from the time when the sum signal SUM falls below the sum signal recording layer threshold value Srec so as to have the objective lens 24 overrun the L0 layer. Then, the microcomputer 6 reverses the moving direction of the objective lens 24 before it goes to the next step, or Step SP8.

If the microcomputer 6 detects the L0 layer according to the recording layer detection requirement in Step SP8, it goes to Step SP9, where it selects the position of the objective lens 24 at the zero cross point of the S-shaped waveform as objective lens bias value and starts operating the focus servo and goes to the next step, or Step SP10 to end the process.

(5) Operation and Advantages

With the above described arrangement, when the optical disk apparatus 1 conducts a focus search operation for the optical disk 100, it firstly corrects the spherical aberration according to the recording layer for which the focus servo is operated and subsequently monitors the sum signal SUM and the focus error signal FE, while keeping on moving the objective lens 24 toward the optical disk 100. Then, the optical disk apparatus 1 determines that the first rise of the sum signal SUM represents the surface of the cover layer and detects the recording layer upon detecting the surface of the cover layer.

At this time, if the target recording layer is the L0 layer of an optical disk having a single recording layer or the L1 layer of an optical disk having two recording layers, the optical disk apparatus 1 determines that it detects the target recording layer when it detects a situation where the recording detection requirement that "the sum signal SUM rises above the sum signal recording layer threshold value Srec and the signal level of the focus error signal FE rises above a predetermined positive focus error threshold value Sfe+ and then falls below it or falls below a predetermined negative focus error threshold value Sfe− and then rises above it" is met for the first time.

If, on the other hand, the target recording layer is the L0 layer of an optical disk having two recording layers, it is uncertain if it can detect the S-shaped waveform of the focus error signal FE attributable to the L1 layer located in front of the L0 layer. Therefore, the optical disk apparatus 1 keeps on moving the objective lens 24 toward the optical disk 100 for a redetection period Tr after detecting a situation where the above described recording layer detection requirement is met (and hence detecting a recording layer) and, if it does not detect any new recording layer in the redetection period Tr, it determines the recording layer detected last to be the L0 layer.

With this arrangement, the optical disk apparatus 1 can reliably detect the target recording layer of a Blu-ray disk where the two recording layers are located close to each other to make it difficult to discriminate the L1 layer and the L0 layer on the basis of the sum signal SUM and uncertain to detect the S-shaped waveform attributable to a recording layer other than the target recording layer. Additionally, the optical disk apparatus 1 can reliably detect the target recording layer of a Blu-ray disk where the reflectivity of the recording layer and that of the surface of the cover layer are close to each other to make it difficult to discriminate the recording layer and the surface of the cover layer on the basis of the sum signal SUM.

Additionally, when the target recording layer is the L0 layer of an optical disk having two recording layers, the optical disk apparatus 1 keeps on moving the objective lens 24 toward the optical disk 100 for the overrun period Tover after detecting the L0 layer so as to make the focal point of the objective lens 24 overrun from the L0 layer and subsequently reverses the moving direction of the objective lens 24 so as to detect the L0 layer by detecting the first zero cross point of the S-shaped waveform on the way back.

In this way, the optical disk apparatus 1 detects the target recording layer in a search operation conducted by moving the objective lens 24 toward the optical disk 100 when the target recording layer is the L0 layer of an optical disk having a single recording layer or the L1 layer of an optical disk having two recording layers, whereas it detects the target recording layer in a search operation conducted by moving the objective lens 24 away from the optical disk 100 when the target recording layer is the L0 layer of an optical disk having two recording layers.

In other words, because the optical disk apparatus 1 is adapted to detect the target recording layer in a search operation directed to detect the target recording layer first, it can reliably detect the target recording layer particularly if it is the L0 layer of an optical disk having two recording layers.

With the above-described arrangement, it is possible to reliably detect the target recording layer for which the focus servo is to be operated. Thus, when an optical disk 100 is mounted into the optical disk apparatus 1 or when the focus servo slips off due to an external turbulence during an operation of recording signals on or reproducing signal from an optical disk, the optical disk apparatus 1 can reliably and quickly pull in the focus servo (as a focus search operation) for the target recording layer of the optical disk 100 and reliably prevent the objective lens 24 from colliding with the optical disk 100 because of a failure of detecting the target recording layer.

(6) Other Embodiments

For the purpose of the present invention, the sum signal cover layer surface threshold value Ssurf, the sum signal recording layer threshold value Srec, the positive and negative focus error threshold values Sfe+ and Sfe−, the redetection period Tr and the overrun period Tover may be modified appropriately depending on the operating condition of the optical disk apparatus 1.

For example, any of the above listed threshold values and the periods may be increased or decreased depending on the recording layer (L0 layer or L1 layer) for which the focus servo is to be pulled in and/or depending on if the pull in is the first one after mounting an optical disk or re-pull in after a slip off of the focus servo so that the operation of pulling in the focus servo can be conducted quickly.

Figure 9:
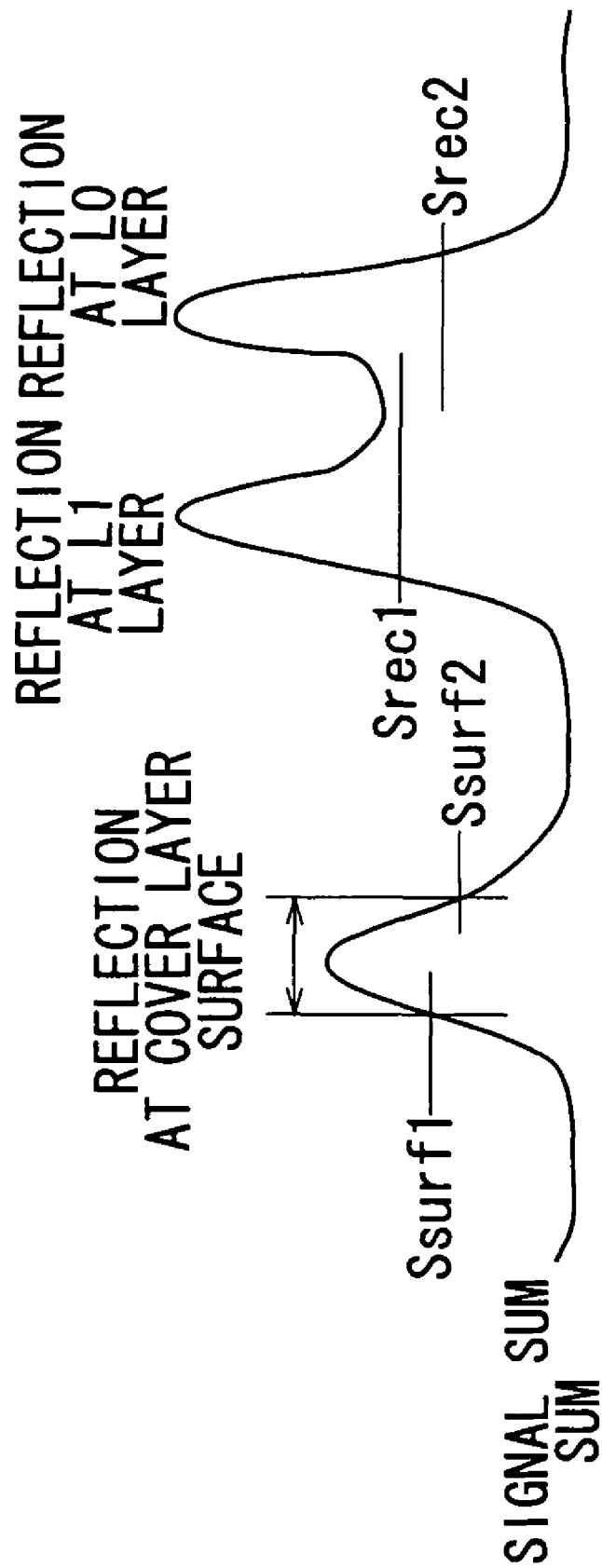
FIG. 9 is a graph of characteristic curves of a sum signal, illustrating the sum signal threshold that can be used by another embodiment.
Figure 10:
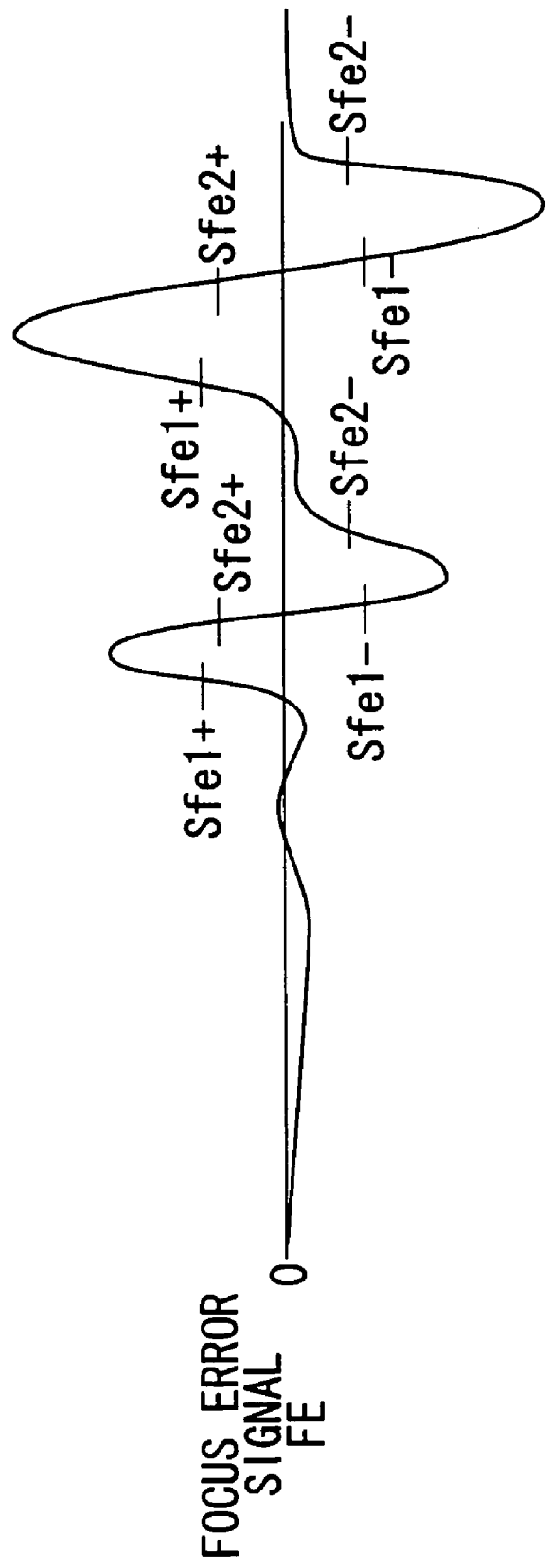
FIG. 10 is a graph of a characteristic curve of a focus error signal, illustrating the focus error threshold of the embodiment of FIG. 9.

While a span that corresponds to the time period from the time when the sum signal SUM rises above the sum signal cover layer surface threshold value Ssurf to the time when it falls below the threshold value is recognized as the surface of the cover layer in the above described embodiment, the present invention is by no means limited thereto. For example, two threshold values including the first sum signal cover layer surface threshold value Ssurf1 and the second sum signal cover layer surface threshold value Ssurf 2 may be defined and the span that corresponds to the time period from the time when the sum signal SUM rises above the first sum signal cover layer surface threshold value Ssurf1 to the time when it falls below the second sum signal cover layer surface threshold value Ssurf2 may be recognized as the surface of the cover layer as shown in FIG. 9.

With such an arrangement, the detection requirement may be modified appropriately by modifying the magnitude relationship of the first sum signal cover layer surface threshold value Ssurf1 and the second sum signal cover layer surface threshold value Ssurf2 so as to facilitate the detection of the cover layer surface or make it difficult to detect the cover layer surface and prevent detection errors.

Similarly, as for the sum signal recording layer threshold value Srec, two threshold values including the first sum signal recording layer threshold value Srec1 and the second sum signal recording layer threshold value Srec2 may be defined and the operation of detecting the target recording layer may be conducted on the basis of the focus error signal FE in the time period from the time when the sum signal SUM rises above the first sum signal recording layer threshold value Srec1 to the time when the sum signal SUM falls below the second sum signal recording layer threshold value Srec2. In this case again, the detection requirement may be modified appropriately by modifying the magnitude relationship of the first sum signal recording layer threshold value Srec1 and the second sum signal recording layer threshold value Srec2.

While a positive focus error threshold value Sfe+ and a negative focus error threshold value Sfe− are used for the detection requirement of the recording layer in the above described embodiment, the present invention is by no means limited thereto. For example, the first positive focus error threshold value Sfe1+, the second positive focus error threshold value Sfe2+, the first negative focus error threshold value Sfe1− and the second negative focus error threshold value Sfe2− may be defined and the recording layer detection request may be defined as a situation that "the signal level of the focus error signal FE rises above the first positive focus error threshold value Sfe1+ and subsequently falls below the second positive focus error threshold value Sfe2+" or that "the signal level of the focus error signal FE falls below the first negative focus error threshold value Sfe1− and subsequently rises above the second negative focus error threshold value Sfe2−".

In this case again, the detection requirement may be modified appropriately by modifying the magnitude relationship of the first and second positive focus error threshold values Sfe1+ and Sfe2+ and the magnitude relationship of the first and second negative focus error threshold values Sfe− and Sfe2− so as to facilitate the detection of the recording layer or make it difficult to detect the recording layer and prevent detection errors.

While the above-described embodiment recognizes a zero cross point of the focus error signal FE as the target recording layer and starts operating the focus servo for the recording layer at the zero cross point, the present invention is by no means limited thereto. For example, the embodiment may alternatively be so arranged as to start operating the focus servo slightly before the zero cross point of the focus error signal FE. Such an arrangement provides an advantage that the focus servo can be operated by fully exploiting the linear part of the focus error signal FE before and after the zero cross point.

An optical disk apparatus, a focus search control method and a focus search control apparatus according to the present invention can find applications in optical disk apparatus adapted to optical disks having a plurality of recording layers.

It should be understood by those skilled in the art that various modifications, combinations sub-combinations and alterations may occur depending on design requirements and other factors insofar as they are within the scope of the appended claims or the equivalents thereof.

What is claimed is:

1. An optical disk apparatus for recording information on and reproducing information from an optical disk formed by sequentially laying a first recording layer, a second recording layer and a cover layer by irradiating a light beam from the cover layer side, the apparatus comprising:

an objective lens for converging the light beam emitted from a light source to irradiate the optical disk;

drive means for driving an objective lens in the direction of the optical axis of the light beam to move the focal position of the light beam;

spherical aberration correcting means for correcting the spherical aberration produced by the light beam according to the first recording layer to be used for recording or reproduction of information;

light receiving means for receiving reflected light of the light beam and generating a sum signal indicating the quantity of light of the reflected light and a focus error signal for outputting the signal level as a function of the distance from the focal position of the light beam to the first recording layer;

recording layer detecting means for moving the focal point of the light beam closer to the first recording layer from the cover layer side and detecting first and second S-shaped waveforms in the focus error signal; and recording layer determining means for determining whether the second S-shaped waveform in the focus error signal indicates the first recording layer by continuing movement of the focal point of the light beam closer to the optical disk after the detection of the second S-shaped waveform by the recording layer detecting means for a predetermined overrun period, and determining that the second S-shaped waveform in the focus error signal indicates the first recording layer when another S-shaped waveform is not detected within the predetermined overrun period.

2. The apparatus according to claim 1, wherein the recording layer detecting means determines that the focal point of the light beam comes closer to the second recording layer when the level of the focus error signal rises above a positive focus error threshold value and subsequently falls below the positive focus error threshold value or when the level of the focus error signal falls below a negative focus error threshold value.

3. The apparatus according to claim 1, further comprising cover layer detecting means for moving the focal point of the light beam closer to the optical disk from the side of the cover layer and determining the focal point of the light beam as passing through the surface of the cover layer when the level of the sum signal falls below a first sum signal threshold value after rising above the first sum signal threshold value for the first time, wherein the recording layer detecting means detects the first recording layer after the detection of the cover layer by the cover layer detecting means.

4. The apparatus according to claim 1, wherein the recording layer detecting means detects the first recording layer when the signal level of the sum signal rises above a second sum signal threshold value.

5. The apparatus according to claim 1, wherein the recording layer detecting means re-detects the first recording layer by reversing the moving direction of the focal point of the light beam so as to move away from the optical disk after the predetermined overrun period lapses.

6. A focal position control method to be used for an optical disk apparatus adapted to recording information to or reproducing information from an optical disk formed by sequentially laying a first recording layer, a second recording layer and a cover layer by irradiating a light beam from the side of the cover layer, the method comprising:

receiving, at the optical disk apparatus, reflected light of the light beam and generating a sum signal indicating the quantity of light of the reflected light and a focus error signal for outputting the signal level as a function of the distance from the focal position of the light beam to the first recording layer;

moving, at the optical disk apparatus, the focal point of the light beam closer to the first recording layer and detecting first and second S-shaped waveforms in the focus error signal;

determining, at the optical disk apparatus, whether the second S-shaped waveform in the focus error signal indicates the first recording layer by continuing movement, of the focal point of the light beam closer to the optical disk after the detection of the second S-shaped waveform for a predetermined overrun period; and determining, at the optical disk apparatus, that the second S-shaped waveform in the focus error signal indicates the first recording layer when another S-shaped waveform is not detected within the predetermined overrun period.

7. The method according to claim 6, further comprising:

determining that the focal point of the light beam comes closer to the second recording layer when the level of the focus error signal rises above a positive focus error threshold value and subsequently falls below the positive focus error threshold value or when the level of the focus error signal falls below a negative focus error threshold value.

8. The method according to claim 6, further comprising moving the focal point of the light beam closer to the optical disk from the side of the cover layer and determining the focal point of the light beam as passing through the surface of the cover layer when the level of the sum signal falls below a first sum signal threshold value after rising above the first sum signal threshold value for the first time, wherein the first recording layer is detected after the cover layer is detected.

9. The method according to claim 6, further comprising:

detecting the first recording layer when the signal level of the sum signal rises above a second sum signal threshold value.

10. The method according to claim 6, further comprising:
re-detecting the first recording layer by reversing the moving direction of the focal point of the light beam so as to move away from the optical disk after the predetermined overrun period lapses.

11. A focal position control apparatus to be used for an optical disk apparatus adapted to recording information to or reproducing information from an optical disk formed by sequentially laying a first recording layer, a second recording layer and a cover layer by irradiating a light beam from the side of the cover layer, the apparatus comprising:
drive means for driving an objective lens for converging the light beam and irradiating it onto the optical disk in the direction of the optical axis of the light beam to move the focal position of the light beam;
spherical aberration correcting means for correcting the spherical aberration produced by the light beam according to the first recording layer to be used for recording or reproduction of information;
recording layer detecting means for moving the focal point of the light beam closer to the first recording layer from the cover layer side and detecting first and second S-shaped waveforms in the focus error signal; and
recording layer determining means for determining whether the second S-shaped waveform in the focus error signal indicates the first recording layer by continuing movement of the focal point of the light beam closer to the optical disk after the detection of the second S-shaped waveform by the recording layer detecting means for a predetermined overrun period, and determining that the second S-shaped waveform in the focus error signal indicates the first recording layer when another S-shaped waveform is not detected within the predetermined overrun period.

12. The apparatus according to claim 11, wherein
the recording layer detecting means determines that the focal point of the light beam comes closer to the second recording layer when the level of the focus error signal rises above a positive focus error threshold value and subsequently falls below the positive focus error threshold value or when the level of the focus error signal falls below a negative focus error threshold value.

13. The apparatus according to claim 11, further comprising
cover layer detecting means for moving the focal point of the light beam closer to the optical disk from the side of the cover layer and determining the focal point of the light beam as passing through the surface of the cover layer when the level of the sum signal falls below a first sum signal threshold value after rising above the first sum signal threshold value for the first time, wherein
the recording layer detecting means detects the first recording layer after the detection of the cover layer by the cover layer detecting means.

14. The apparatus according to claim 11, wherein
the recording layer detecting means detects the first recording layer when the signal level of the sum signal rises above a second sum signal threshold value.

15. The apparatus according to claim 11, wherein
the recording layer detecting means re-detects the first recording layer by reversing the moving direction of the focal point of the light beam so as to move away from the optical disk after the predetermined overrun period lapses.

16. An optical disk apparatus for recording information on and reproducing information from an optical disk formed by sequentially laying a first recording layer, a second recording layer and a cover layer by irradiating a light beam from the cover layer side, the apparatus comprising:
an objective lens for converging the light beam emitted from a light source to irradiate the optical disk;
a drive unit that drives an objective lens in the direction of the optical axis of the light beam to move the focal position of the light beam;
a spherical aberration correcting unit that corrects the spherical aberration produced by the light beam according to the first recording layer to be used for recording or reproduction of information;
a light receiving unit that receives reflected light of the light beam and generates a sum signal indicating the quantity of light of the reflected light and a focus error signal for outputting the signal level as a function of the distance from the focal position of the light beam to the first recording layer;
a recording layer detecting unit that moves the focal point of the light beam closer to the first recording layer from the cover layer side and detects first and second S-shaped waveforms in the focus error signal; and
a recording layer determining unit that determines whether the second S-shaped waveform in the focus error signal indicates the first recording layer by continuing movement of the focal point of the light beam closer to the optical disk after the detection of the second S-shaped waveform by the recording layer detecting unit for a predetermined overrun period, and determines that the second S-shaped waveform in the focus error signal indicates the first recording layer when another S-shaped waveform is not detected within the predetermined overrun period.

17. A focal position control apparatus to be used for an optical disk apparatus adapted to recording information to or reproducing information from an optical disk formed by sequentially laying a first recording layer, a second recording layer and a cover layer by irradiating a light beam from the side of the cover layer, the apparatus comprising:
a drive unit that drives an objective lens for converging the light beam and irradiating it onto the optical disk in the direction of the optical axis of the light beam to move the focal position of the light beam;
a spherical aberration correcting unit that corrects the spherical aberration produced by the light beam according to the first recording layer to be used for recording or reproduction of information;
a recording layer detecting unit that moves the focal point of the light beam closer to the first recording layer from the cover layer side and detects first and second S-shaped waveforms in the focus error signal; and
a recording layer determining unit that determines whether the second S-shaped waveform in the focus error signal indicates the first recording layer by continuing movement of the focal point of the light beam closer to the optical disk after the detection of the second S-shaped waveform by the recording layer detecting unit for a predetermined overrun period, and determines that the second S-shaped waveform in the focus error signal indicates the first recording layer when another S-shaped waveform is not detected within the predetermined overrun period.

18. The apparatus according to claim 11, wherein the recording layer determining means, after the overrun period lapses, moves the focal point of the light beam further away from the optical disk and redetects the first recording layer in an opposite direction.

19. The apparatus according to claim 1, wherein the recording layer detecting means detects the first recording layer when the sum signal rises above a sum signal threshold value and a signal level of the focus error signal rises above a positive focus error threshold and then falls below the positive focus error threshold.

* * * * *